United States Patent [19]

Jacocks

[11] 3,719,601
[45] March 6, 1973

[54] MAGNESIUM SILICATE THICKENED HYDROCARBON INSULATING FLUIDS

[75] Inventor: Claud L. Jacocks, Ponca City, Okla.

[73] Assignee: Continental Oil Company, Ponca City, Okla.

[22] Filed: Feb. 9, 1971

[21] Appl. No.: 114,075

[52] U.S. Cl. .................. 252/62, 166/302, 252/8.5, 252/8.55
[51] Int. Cl. ............................................. C04b 43/04
[58] Field of Search ......... 252/62, 8.5, 8.55; 166/302

[56] References Cited

UNITED STATES PATENTS

| | | | |
|---|---|---|---|
| 3,489,685 | 1/1970 | Kublicki | 252/62 |
| 2,995,514 | 8/1961 | Jordan et al. | 252/62 |
| 2,971,878 | 9/1961 | Heilman et al. | 252/62 |
| 2,830,948 | 4/1958 | Popham | 252/8.5 N |
| 2,678,697 | 5/1954 | Fischer | 252/8.55 R |

OTHER PUBLICATIONS

Stern, Region of Investigations no. 3556 U.S. Bureau of Mines 1941 pp. 8–10 and 8a (8a is page having FIGS. 1 and 2).

Primary Examiner—George F. Lesmes
Assistant Examiner—J. P. Branner
Attorney—Joseph C. Kotarski, Henry H. Huth, Robert B. Coleman, Jr., Gerald L. Floyd and Carroll Palmer

[57] ABSTRACT

Mineral oil viscosified with a finely divided fibrous magnesium silicate including asbestos products, is employed as a fluid insulating medium. Thermal injection wells for oil recovery are insulated therewith.

5 Claims, No Drawings

MAGNESIUM SILICATE THICKENED HYDROCARBON INSULATING FLUIDS

BACKGROUND OF THE INVENTION

This invention relates to an insulating process wherein a liquid insulating medium is employed comprising a liquid mineral oil plus a finely divided fibrous magnesium silicate or asbestos.

The invention further relates to an improved process for insulating thermal injection wells wherein a liquid insulating medium comprising a liquid mineral oil plus a finely divided fibrous magnesium silicate or asbestos is employed as the liquid insulating medium.

Improved fluid insulating mediums are needed.

Thus, heat loss from thermal injection wells employed in the secondary or tertiary recovery of hydrocarbon reserves is a serious problem. This problem has been mitigated to a considerable extent by forming a jacket or filling the space between the casing of a thermal injection well and the injection conduit with a fluid insulating medium such as a mineral oil. However, this expedient still has serious shortcomings. Convection currents develop in the hydrocarbon jacket with consequent serious loss of heat energy. An improved fluid insulating medium is most desirable in this application.

Another problem exists in the production of hydrocarbons in arctic environments. Thus, when fluid hydrocarbons are produced from underground reservoirs at relatively high ambient temperatures and are passed through a permafrost region, the permafrost in the region of the well bore is melted with consequent problems of stability of the well bore in the permafrost region. In this application also, an improved fluid insulating medium to lower or prevent heat transfer to the permafrost would be most desirable.

Many other applications are well known to those skilled in the art wherein improved fluid insulating mediums would be of great benefit.

OBJECTS OF THE INVENTION

An object of the invention is to provide a process for insulating wherein a liquid insulating medium comprising a mineral oil plus a fibrous finely divided magnesium silicate or asbestos is maintained between a heat source locus and an insulated locus.

A further object of this invention is to provide an improvement in the process for insulating a thermal injection well with a jacket of liquid insulating medium, the improvement involving employing a liquid insulating medium comprising a mineral oil and a finely divided magnesium silicate or asbestos.

These and other objects and advantages will appear from the following description of the embodiments of the invention, and the most novel features will be particularly pointed out hereinafter in connection with the appended claims.

SUMMARY OF THE INVENTION

In one aspect, this invention discloses a process for insulating which comprises maintaining a liquid comprising a mineral oil plus a particulate fibrous magnesium silicate, inclusive of asbestos products, between a heat source locus and an insulated locus.

In another aspect, this invention discloses an improvement in the process for insulating a thermal injection well with a jacket containing a liquid insulating medium, the improvement comprising employing a liquid insulating medium comprising a mineral oil and a finely divided magnesium silicate or a finely divided asbestos.

DESCRIPTION OF THE PREFERRED EMBODIMENT

According to the process of this invention, an insulating medium comprising a mineral oil plus a finely divided fibrous magnesium silicate or a finely divided fibrous asbestos is maintained between a heat source locus and an insulated locus. The insulating medium of this invention can be maintained in such position by any means known to the art for maintaining any prior art liquid insulating medium in place. Often, it is desired to insulate a conduit carrying a heated material or to insulate a conduit carrying a material which is at a temperature lower than that of the surrounding environment. In such a situation, it is often convenient to maintain the liquid insulating media in a jacket around the conduit by running the conduit through a larger conduit, sealing any openings, and filling the resulting space with the liquid insulating medium.

The liquid insulating medium of this invention is comprised of a liquid hydrocarbon and a member of the class consisting of a finely divided fibrous magnesium silicate and a finely divided fibrous asbestos. Mixtures of finely divided fibrous magnesium silicate and finely divided fibrous asbestos can also be employed.

Preferably, the liquid hydrocarbon comprises in the range of 90 to 99 weight percent of the insulating medium. Examples of such hydrocarbons include liquid mineral oils and synthetic hydrocarbons which have a viscosity in the range of 100 to 200 SUS at 210°F. Aliphatic, naphthenic, or aromatic hydrocarbons can be employed, and mixtures are also suitable. A petroleum base paraffinic hydrocarbon fraction prepared by extracting a lube residuum and having a viscosity index of about 95 is a presently preferred hydrocarbon component of the insulating medium.

The portion of the insulating medium which is made up of a finely divided fibrous magnesium silicate or asbestos can comprise in the range of 1 to 10 weight percent of the insulating medium. An example of a presently preferred magnesium silicate is: "AVIBEST-C" (trademark) microcrystalline silicate is available from FMC Corp., Princeton, N.J., and is a hydrated magnesium silicate having 37 weight percent Mg as MgO, 43 weight percent Si as $SiO_2$, 4 weight percent Fe as $Fe_2O_3$, and 12 weight percent $H_2O$. It is a light-grey microcrystalline, fibrous powder having a bulk density of 10 lb./cu. ft., a density of 2.2 g/cc, a pH of 7.5, a refractive index of 1.5, a surface area of 68 sq. m/g. It is obtained by treatment of naturally occurring chrysotile. Typical microcrystals have a diameter of 200 A and a length of 4,000 A.

An example of a presently preferred asbestos product is: "CALIDRIA" Asbestos (trademark of Union Carbide Corp., New York, N.Y.) a short fiber particulate chrysotile asbestos product.

Particle size of such finely divided fibrous magnesium silicates or asbestos products is in the range of 0.01 to 0.05 microns in diameter and 0.2 to 0.6 microns in length.

If desired, other components such as stabilizers, inhibitors, and the like can also be incorporated into the liquid insulating media of the instant invention. Examples of such materials include hindered phenols (2,6-ditertiary-dibutyl-para-cresol), pentyl-α-naphthyl amine; Zn di-thiophosphate, and the like.

The liquid insulating media of this invention can be formulated by any means known to the art for the formulation of finely divided solids and liquids. Conveniently, the finely divided fibrous magnesium silicates and/or asbestos particles can be added to the liquid hydrocarbon which is agitated vigorously in a high speed blender. Other suitable means known to the art can also be employed.

The liquid insulating media of this invention are particularly advantageous for insulating thermal injection wells for secondary or tertiary hydrocarbon recovery wherein such liquid insulating media are employed to fill the annulus between the casing and injection conduit. Temperatures of such environments often range from about 150°F. to about 650°F.

More generally the liquid insulating media of this invention can be employed at any temperature below the decomposition point of the particular hydrocarbon employed at which such insulating media remain liquid. Pressure sufficient to maintain in the liquid state can be employed. Often temperatures in the range of 450°F. to 650°F. are particularly suitable.

EXAMPLE 1

A series of runs were made wherein "CALIDRIA" Asbestos (trademark), a processed finely-divided fibrous asbestos from Union Carbide Corp. New York, N.Y., and "AVIBEST-C" (trademark), a micrycrystalline fibrous magnesium silicate available from the FMC Corporation, Princeton, N.J., were each admixed in a bright paraffinic mineral oil stock (having a viscosity index of 95 and produced by an extraction of a lube residuum) by blending the materials in the oil with a Waring blender for 10 minutes in amounts as disclosed by the following Table 1.

A HAAKE ROTOVISCO viscometer, a rotating bob instrument that can be used with fluids at elevated temperatures, was used to measure the viscosity of the samples. Data are reported in Table 1, and constitute the viscosities measured for a 176 inverse second shear rate test.

TABLE I

CPS AT 176 SEC$^{-1}$ SHEAR RATE

| Temp °F | Bright Stock | "CALIDRIA" Asbestos | | | "AVIBEST—C" | | |
|---|---|---|---|---|---|---|---|
| | | 1.5 Wt. % | 5.5 Wt. % | 7 Wt. % | 1.5 Wt. % | 2 Wt. % | 3 Wt. % |
| 100 | 486 | 762 | 1287.4 | 1664.2 | 730 | 753.6 | 902.8 |
| 200 | 43 | 85 | 272.8 | 391.9 | 123 | 119.3 | 216.3 |
| 300 | 20 | 25 | 69.8 | 112.1 | 46 | 49.4 | 116.0 |
| 350 | 15 | 16.5 | 55.7 | 76.8 | 30 | 40.0 | 83.9 |
| 400 | 10 | | 47.0 | 81.5 | 22 | 36.1 | 64.3 |
| 450 | 12 | | 51.7 | 76.8 | 21 | 31.4 | 51.7 |
| 500 | 12 | | 51.0 | 72.9 | 21 | 31.4 | 47.0 |

From these data it is readily seen that the insulating media of the instant invention have greatly improved insulating properties as compared to mineral oils which have been used previously. Thus, 7 weight percent of "CALIDRIA" asbestos product increased the viscosity six-fold at 500°F. This is calculated to result in a minimum reduction of 40 percent in the calculated heat transfer coefficient.

All mixtures were sealed in pressure bombs and held at 550°F. for one week. No evidence of phase separation or thermal degradation was noted in any of the inventive compounds at the end of this period.

"CAB-O-SIL" product (a trademark for a finely divided silica product from the Cabot Corp., Boston, Mass.) was tested in a similar test and found to be unsatisfactory because of temperature instability of the resulting liquid insulating media.

This example demonstrates the superior insulating properties of the fluid insulating media of this invention as compared to the hydrocarbon alone, which was previously employed as an insulating medium. Vastly improved viscosities are obtained.

Calculation of the Grashof number and heat transfer coefficient for such media can readily be calculated; see the *Handbook of Fluid Dynamics*, Streeter, Page 6–32 and 48.

EXAMPLE 2

A series of thermal conductivity runs were made to compare the insulating properties of exemplary insulating mediums of the instant invention with mineral oil, which had previously been employed as an insulating medium.

A conductivity cell consisting of a 1⅞ inch outside diameter pipe mounted concentrically inside a four-foot length of 4½ inch outside diameter steel casing was fabricated. The annular space was approximately 1.06 inches wide. The annular volume was approximately 6,400 cc. Eight iron-constantan thermocouples were embedded in the inner wall of the pipe and the outer wall of the casing. Inner and outer thermocouples were positioned opposite each other at 10 inches linear intervals and 90° radial offset between adjacent positions. All thermocouples were attached to a Texas Instruments electronic recorder with a range of 0°–600°F. A boiler (a cylindrical steel vessel of approximately 2,000 cc. capacity) was connected to the bottom of the column by a length of ¾ inch pipe. The condenser mounted on the top of the inner pipe was cooled with tap water. The system was vented to the atmosphere. Liquid from the condenser returned to the boiler through a ½ inch copper tube mounted outside the casing. The main source of heat was a 3,990 watt, 220 volt heater placed around the boiler. Additional heating was required to maintain reflux of the "DOWTHERM" (a trademark for a chlorinated phenol heat transfer medium produced by Dow Chemical Company, Midland, Mich.) which was employed as a heating medium in the reflux system. This was supplied by 3 two foot long 110 volt flexible heating tapes placed around the pipe at the top of the boiler, bottom of the pipe and top of the pipe. Variable resistors were used to control voltage to all heaters. The casing was wrapped with asbestos insulation.

To maintain reflux through the system, the boiler was held at 1,000°F. and the flexible tapes were held at maximum voltage. Time required to stabilize the reflux from room temperature was about 3 hours. The temperature recorder was started when the boiler reached the boiling point of the "DOWTHERM" heat transfer medium (approximately 450°F.). The annulus was closed and the reflux was maintained under a maximum pressure of 400 psi.

The difference in temperatures between the inner pipe and the outer casing was determined by a pair of thermocouples approximately two-thirds of the way up the column. The difference in these temperatures at varying temperatures of the internal pipe were indicative of the insulating value of the various fluid insulating media evaluated. The essence of data from a series of runs is presented below in TABLE 2.

TABLE 2

| | internal Temp, °F | external Temp, °F | difference in Temp, °F |
|---|---|---|---|
| Run 1 (10 lb./bbl. "AVIBEST-C"[1] in Bright Stock)[2] | 460 | 170 | 290 |
| Run 2 (10 lb./bbl. "AVIBEST-C"[1] in Bright Stock)[2] | 505 | 250 | 255 |
| Run 3 (10 lb./bbl. "AVIBEST-C"[1] in Bright Stock)[2] | 460 | 250 | 210 |
| Run 4 (10 lb./bbl. "AVIBEST-C"[1] in Bright Stock)[2] | 495 | 250 | 245 |
| Run 5 Control (Bright Stock)[2] | 325 | 250 | 75 |

1 "AVIBEST-C" product is a microcrystalline magnesium silicate, product of the FMC Corp.
2 Bright Stock is a 95 V.I. paraffinic mineral oil. Bright Stock is produced by an extraction from a lube residuum.

These data clearly demonstrate the superior insulting properties of an exemplary liquid insulating medium of the instant invention in comparison to a mineral oil liquid insulating medium of the prior art.

EXAMPLE 3

Runs wherein exemplary liquid insulating media of the instant invention were allowed to stand in a pressure bomb at 500°F. demonstrated that no appreciable settling of the finely divided fibrous magnesium silicate or asbestos occurred upon examination after a period of two weeks.

This example demonstrates that the improved insulating media of this invention have satisfactory stability at high temperatures.

I claim:

1. A process for insulating a conduit carrying a fluid having a temperature higher than that of the surrounding environment from the surrounding environment comprising confining in place substantially completely free from movement a liquid insulating medium comprising 90 to 99 weight percent of a liquid hydrocarbon plus 1–10 weight percent of the medium of a particulate magnesium silicate, inclusive of asbestos products, between the conduit and the surrounding environment, the liquid insulating medium being at a temperature higher than that of the surrounding environment but at a temperature lower than that of the conduit carrying the fluid.

2. The process of claim 1 wherein said liquid hydrocarbon is a mineral oil which has a viscosity in the range of 100 to 200 SUS at 210°F; wherein the diameter of the fibrous magnesium silicate particles is about 0.01 to 0.05 microns and the length is about 0.2 to 0.6 microns.

3. The process of claim 2, wherein the conduit is a well casing producing hydrocarbons from an underground reservoir which passes through and is insulated from a permafrost region, the hydrocarbons having a higher temperature than the permafrost.

4. The process of claim 2, wherein the conduit is a pipeline traversing a permafrost region and carrying a hydrocarbon at a temperature greater than that of the permafrost region; wherein the liquid insulating medium is confined in place and substantially completely motionless by means of a jacket surrounding the pipeline.

5. In a process for insulating a thermal injection well with a jacket of a liquid insulating medium, the improvement comprising employing a liquid insulating medium comprising about 90 to 99 weight percent of a mineral oil having a viscosity in the range of 100 to 200 SUS at 210°F plus about 1 to 10 weight percent of a particulate fibrous microcrystalline magnesium silicate product, inclusive of an asbestos product, said product having a fiber diameter of about 0.01 to 0.05 microns and a length of about 0.2 to 0.6 microns.

* * * * *